Nov. 17, 1931.                H. J. PARDEE                1,832,731
                           TREATMENT OF IRON ORES
                             Filed Aug. 25, 1927            2 Sheets-Sheet 2
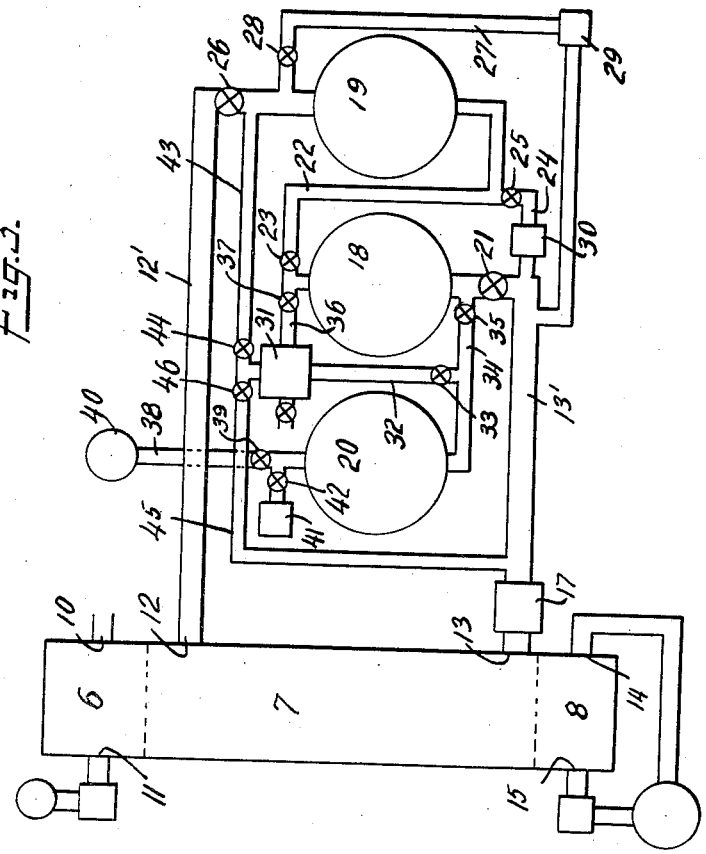
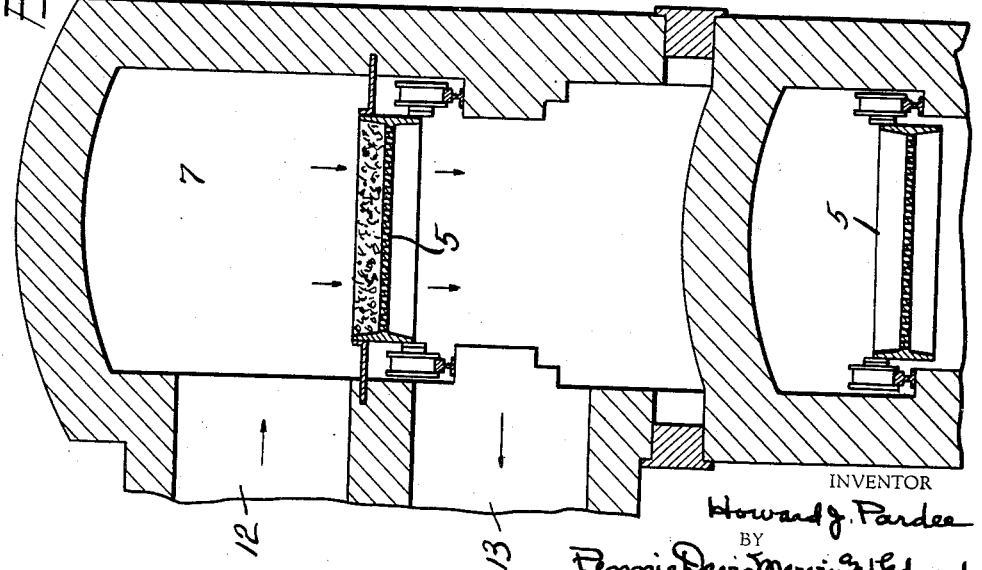
INVENTOR
Howard J. Pardee
BY
Pennie, Davis, Marvin and Edmonds
ATTORNEYS Patented Nov. 17, 1931

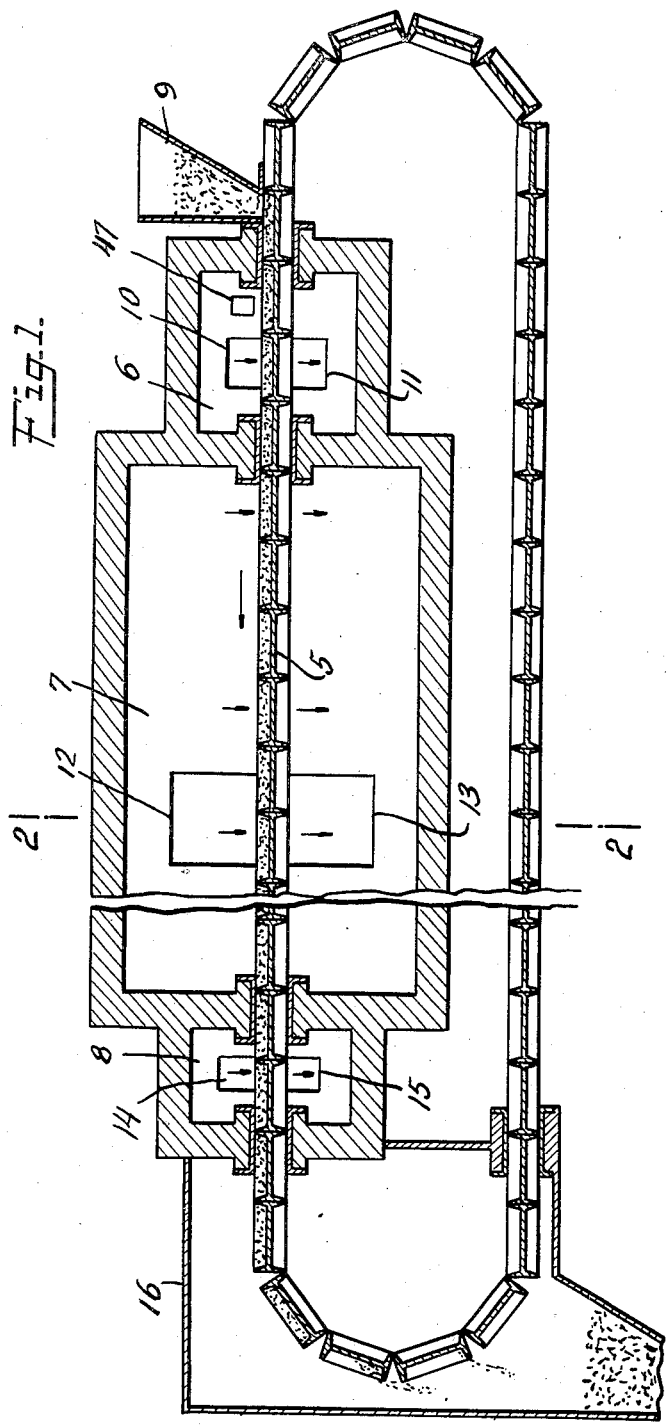

1,832,731

UNITED STATES PATENT OFFICE

HOWARD J. PARDEE, OF NEW YORK, N. Y.

TREATMENT OF IRON ORES

Application filed August 25, 1927. Serial No. 215,372.

This invention relates to the treatment of iron ores and more especially to the production of sponge iron from iron ores, more particularly iron ores that cannot be economically smelted in a blast furnace. The invention aims to provide an improved method of and apparatus for reducing iron ores, more particularly for the production of sponge iron.

Sponge iron was one of the earliest forms of metallic iron obtained from iron ores. In modern times, however, the rapid advances made in the manufacturing methods of making pig iron have relegated sponge iron to an almost negligible nook in the iron industry. Sponge iron has the decided advantage over pig iron of containing less of certain troublesome impurities. This property of sponge iron not only saves considerable expense in refining, but gives better steel and iron. In many chemical processes, such as the precipitation of copper and lead, sponge iron is wanted, because the finely divided nature of the sponge gives an enormous surface area and excellent reaction conditions. Accordingly, it is not surprising to find that in recent years a few sponge iron processes have been sufficiently developed to have gained back a small economic field.

In the making of sponge iron, some form of carbon is the usual commercial source of heat and of reducing energy. The temperature for practical reduction should be 850° C. or higher, although in practice limited to not much above 1000° C. by the melting or fusing temperature of the gangue constituents in the ore. Where this gangue fuses and covers the particles of iron oxide in the ore, reduction is greatly retarded and may even cease entirely. A high ratio of carbon monoxide to carbon dioxide, say about 6 to 1, should preferably be maintained for practical reduction.

In the prior methods and proposals for making sponge iron, two general means have been employed for maintaining the necessary temperature and ratio of carbon monoxide to carbon dioxide. The first involves heating a mixture of iron ore and some form of carbon, and the second involves passing a reducing gas over or through the ore, while maintaining the proper reaction temperature. Some consideration has recently been given to the possibility of recirculating the reducing gas with regeneration of its carbon monoxide content between passages through the ore.

My present invention, in one of its aspects, involves the circulation of an appropriate reducing gas through a bed of iron ore with regeneration of the reducing capacity of the gas between passages through the ore bed. While I am aware that this method of producing sponge iron is not broadly novel, I have embodied and incorporated in the method of the invention certain new and improved combinations of steps and conditions of control and operation that enable me to produce a better grade of metallic iron with greater efficiency and economy than has heretofore been possible.

In its broader aspect, my present invention involves supporting the iron ore or other iron-bearing material to be reduced upon a moving perforate hearth, and subjecting the ore, while so supported and while heated to a temperature sufficiently high to effect active reduction of the compounds of iron therein, to the action of a reducing gas passed through the ore and the perforate hearth. In its more complete aspect, the invention involves progressively advancing the ore, while supported on the moving perforate hearth, first through a heating zone in which the ore is raised to a sufficiently high temperature to effect active reduction of the compounds of iron therein and then through a reducing zone in which the compounds of iron are reduced to sponge iron by a heated reducing gas passing through the heated ore and finally through a cooling zone in which the product of the reducing step is subjected to a cooling treatment under substantially non-oxidizing conditions. The reducing gas preferably flows through a circulating system in which appropriate means are provided for heating the exhaust gases of the reducing operation and then regenerating the reducing capacity of the heated gases for their return to the reducing operation.

The novel features of the invention which I believe to be patentably characteristic thereof are set forth in the appended claims and will be best understood from the following description taken in conjunction with the accompanying drawings, in which Fig. 1 is a longitudinal sectional elevation of a furnace particularly adapted for the practice of the invention.

Fig. 2 is a cross-sectional elevation of the furnace shown in Fig. 1, and

Fig. 3 is a diagrammatic illustration of the furnace and appurtenances for regenerating the reducing gases.

The apparatus illustrated in Figs. 1 and 2 of the accompanying drawings comprises a moving perforate hearth or grate 5, of the endless conveyor type, adapted to move in the direction of the arrow in Fig. 1 through a heating chamber 6, a reducing chamber 7 and a cooling chamber 8 of an appropriate furnace structure. The iron ore, or mixture of iron ore and carbonaceous material, is charged from a feed hopper 9 onto the moving hearth. The heating chamber 6 is provided above the moving hearth 5 with one or more gas ports 10 for introducing into the chamber a combustion supporting gas or other gaseous agent for heating the layer or bed of ore supported on the hearth. Below the hearth 5 the heating chamber 6 is provided with a gas exit port or ports 11.

The reducing chamber is provided above the hearth 5 with one or more gas ports 12 for introducing the reducing gas above the layer or bed of ore supported on the hearth. Below the hearth 5 the reducing chamber 12 is provided with one or more gas exit ports 13. The reducing gas is drawn downwardly through the layer or bed of ore and through the perforations in the moving hearth or grate 5 by draft or suction means more particularly described hereinafter.

Like the heating and reducing chambers, the cooling chamber is provided with one or more gas entrance ports 14 and one or more gas exit ports 15, respectively above and below the moving perforate hearth 5. The discharge or dump end of the moving hearth 5 may if desired be enclosed by an appropriate structure 16 in order to assure exclusion of oxidizing influences until the product of the reducing operation has been sufficiently cooled.

In Fig. 3 of the accompanying drawings, I have diagrammatically illustrated my present preferred arrangement of the circulating system for the reducing gas. The reducing gas flows from the regenerating apparatus through a duct 12' to the gas entrance ports 12 of the reducing chamber. A fan 17 draws the reducing gas through the layer or bed of ore supported on the hearth and through the gas exit ports 13 and forces the exhaust gas through a duct 13' to the regenerating apparatus.

The regenerating apparatus for the reducing gas comprises generally heaters 18 for the exhaust reducing gas withdrawn from the reducing chamber 7, regenerators 19 and air preheaters 20. The duct 13' communicates with the heater 18 by appropriate manipulation of a valve 21. A duct 22 having a valve 23 connects the gas exit end of the heater 18 with the gas entrance end of the regenerator 19. A by-pass duct 24 having a valve 25 is connected between the ducts 13' and 22. The duct 12' communicates with the gas exit end of the regenerator by manipulation of a valve 26. A by-pass duct 27 having a valve 28 and fan 29 is connected between the ducts 13' and 12'.

The exhaust reducing gas drawn from the reducing chamber passes through the heater 18 and then through the regenerator 19 to the duct 12' and thence to the reducing chamber 7. The regenerator 19 contains carbonaceous material through which the heated gas passes and where by virtue of its heat it reacts with carbon to convert most of its carbon dioxide content ($CO_2$) to carbon monoxide (CO). In case the regenerated reducing gas still contains too high a content of carbon dioxide, or is too cool for introduction into the reducing chamber 7, a part or all of it may be by-passed by duct 27 through the regenerating apparatus until the regenerated gas has the desired composition and temperature. In case the regenerated gas is too hot, part or all of the gas from the duct 13' may be passed direct to the regenerator 19 through the by-pass 24. Flow through the by-pass 24 may be reversed by a fan 30 if a hotter gas is desired. By appropriate manipulation of the control valves 25 and 28 substantially any desired temperature and gas content can be obtained in the regenerated reducing gas.

In practice, several gas heaters 18 are provided, preferably of the well-known checker brickwork type. These may advantageously be heated by the hot products of combustion from a furnace or combustion chamber 31. The hot gases from the furnace 31 may be passed to the heater 18 through a duct 36 having a control valve 37. From the heater 18, the heating gases pass into a duct 34 connecting the heater 18 and preheater 20 and having a valve 35. Certain of the heaters 18 will be operatively connected to the furnace 31 for heating up (with valves 21 and 23 closed and valves 35 and 37 open), while others of the heaters 18 will be operatively connected to the duct 13' and regenerator 19 (with valves 21 and 23 open and valves 35 and 37 closed), as hereinbefore described, for heating the reducing gas, whereby the process of regenerating the reducing gas is made continuous.

The heating gas from the furnace 31 after passing through the heater 18 will still be at a relatively high temperature. The heat of these gases may be advantageously used for preheating the air for the furnace 31. To this end, air preheaters 20, preferably of the checker brickwork type, are provided, and the exhaust heating gases from a heater 18 are passed through the duct 34 to a preheater 20, and escape from the preheater through a duct 38, having a valve 39, to a stack 40. Certain of the preheaters 20 will be heating up while others are preheating the air for the furnace 31, thus making the process continuous. When preheating air, a fan 41 having an associated control valve 42 will force air through the preheater and from the duct 34 into the furnace 31 through a duct 32 having a control valve 33. The amount of this air can be controlled by the fan or by throttling an appropriate control valve at some point in the system.

The fuel for the furnace or combustion chamber 31 may advantageously be supplied from the excess reducing gas produced by the regeneration. This gas can be conducted from the regenerator 19 to the furnace 31 through a duct 43 having a control valve 44. If desired, reducing gas before regeneration may be conducted through a duct 45, having a control valve 46 for supplying fuel for the furnace 31. In certain cases it will be found desirable by regulating the valves 44 and 46 to supply both unregenerated and regenerated reducing gas to the furnace 31. Whether or not the proper amount of heat is being supplied to the system will be indicated by the temperature of the exhaust heating gases going up to stack 40. Where more heat is required than can be economically supplied by the excess reducing gas, such heat may be obtained by burning coal, oil, gas, or other appropriate fuel, either in the same combustion chamber 31 or in a separate chamber. Where a separate chamber is used, the hot gases therefrom may be introduced into the system at the entrance of the heater 18, or between the heater 18 and the preheater 20.

The general principles of operation of the apparatus illustrated in the accompanying drawings when used in practicing the present invention will, it is believed, be clear from the foregoing description. The iron ore or other iron-bearing material is fed from the hopper 9 onto the moving perforate hearth 5 in a layer or bed of appropriate thickness. As the ore is advanced through the heating chamber 6 it is heated to a temperature preferably between 850° C. and 1100° C. The heated ore now advances into the reducing chamber 7 where under the prevailing temperature conditions the compounds of iron in the ore are reduced to sponge iron by the reducing gas passed through the layer or bed of ore. The product of the reducing step or operation, consisting of sponge iron associated with the gangue or other inert or worthless material of the original ore, is advanced by the moving hearth into the cooling chamber 8, where a non-oxidizing cooling gas passes through the product and cools it to a sufficiently low temperature to inhibit any subsequent substantial oxidation of the sponge iron. The reducing gas is circulated through the reducing chamber 7 and the regenerating system in the manner hereinbefore described.

The iron ore or other iron-bearing material employed in practicing the invention will be finely divided. The applicability of the process of the invention to the treatment of finely divided iron ores is of particular economic value. There are large deposits of ore low in iron which can be cheaply concentrated, but, under prevailing practices, there is no market for the resulting fine product or concentrate. In addition, there are large tonnages of iron concentrates from non-ferrous workings that now go to the dump. These iron-bearing materials provide a large and cheap supply of iron ore for the process of the invention. Although good porous hematites and magnetites are best adapted for the practice of the invention, many other iron ores may be utilized which are now practically worthless. The finely divided condition of the ore enables the use of magnetites with siliceous gangues too dense to be reduced in large lumps or pieces. Clayey limonites may be mixed with crushed sintered ore or sponge iron and enough gas gotten through to drive off the water so that they can be reduced. Ores containing considerable sulfur or roasted sulfides may have an excess of heated air passed through them while heating, and the sulfur content correspondingly reduced. Flue dust may be sintered or baked a little, held on the grate and reduced.

In practicing the invention in the furnace illustrated in Figs. 1 and 2 of the drawings, the finely divided iron ore will be supported on the moving perforate grate in a relatively thin bed (approximately six inches deep) and a down draft of the reducing gas will be employed. In the reducing chamber the operating temperature should preferably be not less than about 850° C. and not higher than about 1150° C. In most cases a temperature of between 900 and 1000° C. is very satisfactory. Heating, reducing and cooling are all performed on the same moving hearth, yet each operation may be carried out independently in its own individual most efficient manner. The heat conditions resulting from reduction in this type of furnace are remarkably good. The reaction is exothermic, but takes place in three steps. The first two steps together are only a little exothermic, so that during the early and more rapid reduction only a little heat is given off, usually just about enough to offset the heat leakage. The third step is more strongly exothermic but the reaction is slower, so that again the heat produced will just about balance heat leakage. If the ore and reducing gas are each preheated to an appropriate temperature, any practical operating temperature may be maintained during the reduction to give the best possible equilibrium conditions and speed of reaction.

While the iron ore to be reduced is in a finely divided condition as compared with the iron ore employed in blast furnace practice, I do not wish to be understood as implying by that language a relatively fine state of subdivision. The finer the ore the more resistance the ore bed on the moving hearth will offer to the passage of the reducing and other gases therethrough. On the other hand, if the particles of ore are too large or coarse, effective reduction by gases becomes difficult and uneconomical. Ordinarily, I prefer that the ore for practicing the present invention be crushed to pass a one-eighth to a one-quarter inch mesh screen. For the optimum results, the ore particles should not exceed an average diameter of from three-eighths to one-half inch. By finely divided, I, therefore, mean that substantially all of the ore will pass a one-half inch mesh screen.

The ore may be heated in the chamber 6 by passing a heating gas of the necessary temperature therethrough. For this purpose the heating gas should have an initial temperature approaching 1050 to 1100° C. I prefer to heat the ore by mixing therewith some form of carbon and passing a combustion supporting gas, such as air, through the mixture. The air or other gas for combustion should be preheated so that the top layers of the ore bed will be kept hot. Where the ore is thus heated by the combustion of carbonaceous fuel mixed therewith, an ignitor 47 should be provided near the entrance end of the heating chamber 6 and above the entering ore bed so as to start or initiate combustion of the carbonaceous fuel.

It is necessary to cool the sponge iron in the product of the reducing operation to a temperature of about 600° out of contact with air or other oxidizing influences in order to prevent excessive reoxidation of the sponge iron. In the practice of the present invention, such cooling is preferably effected by passing a cool gas downwardly through the reduced product while advancing through the cooling chamber 8. The cooling gas may advantageously be air, recirculated and cooled. The total amount of such air in the recirculating system is relatively small, and what oxygen was contained in the original air is burned out in the first few passages through the reduced mass.

The control of the operation carried out in the apparatus illustrated is convenient and simple. The various fans provided control the amount of draft. The rate of movement of the hearth controls the reducing time. The temperature and composition of the reducing gas is controlled in the regeneration system. The temperature of the ore is controlled by the rate of the fan for the heating gases introduced into the chamber 6. The cooling is similarly controlled by the rate of the fan for the cooling gases. Each factor can be adjusted independently of the others, so that the best conditions may be maintained for the particular operations in each step of the process.

Economic considerations make carbon monoxide the most important reducing agent in the reducing gas. Ordinarily, the reducing capacity of the reducing gas will be determined principally by its carbon monoxide content. Other reducing gases may, however, be utilized, principally in conjunction with carbon monoxide and in relatively smaller proportions. For example, the reducing gas may contain hydrogen, which may be incorporated therein by introducing steam in the exhaust reducing gas before it enters the heater 18 of the regenerating system. In the regenerating system this steam will be decomposed into hydrogen and carbon monoxide. Cyanogen may be introduced into the reducing gas where this is not objectionable on account of the use to which the sponge iron is to be put. Hydrocarbons are available as reducing agents in the process of the invention. Ordinarily, hydrocarbons do not get hot enough in the smelting operation to break up into hydrogen and carbon but pass up the stacks unaltered. In themselves they are not very active reducing agents. In the practice of the present invention, high volatile coal may be used in place of coke in the regenerating apparatus. Hydrocarbons will then be driven off and will make the first pass through the ore substantially unaltered and practically inactive. On the recirculation, however, the hydrocarbons strike the very hot gas heater, and here they are broken up with the production of hydrogen and carbon, which latter, although graphite, will reduce part of the carbon dioxide present and give carbon monoxide. This series of reactions is very strongly endothermic, and takes place in the heater—the ideal place. It will result in just that much more regeneration being accomplished at each passage through the system.

Oil may be efficiently used in locations where it competes with coal. Thus, it may be sprayed into the inlet manifold of the gas heater 18.

Under favorable conditions of operation the product of the invention is a clean, very porous sponge iron with 96 to 98% of its iron reduced. The impurities in the iron will consist principally of the gangue of the ore. If the percentage of gangue is large, it may be removed by magnetic separation, but concentration prior to reduction is, in most cases, more effective. The sponge iron produced by the invention does not contain the considerable coal ash that is frequently present in present day sponge iron products. The amount of coal mixed with the ore for heating is small, and, if the matter is important, none at all need be used and no excess carbon is left over in the sponge iron.

The temperature of the reducing gas at the stage of its entrance into the reducing chamber will depend to some extent upon the nature of the ore to be reduced and the heat-insulating characteristics of the reducing chamber. As will be evident from the foregoing description, the reducing chamber is constructed to substantially prevent the ingress of air or the egress of the reducing gas. In other words, the reducing chamber is substantially gas tight. Both above and below the moving hearth, the furnace structure of the reducing chamber is built of appropriate insulating refractories for the most economical conservation of heat. The reducing action being itself exothermic, it follows that the better the heat insulating properties (i. e. the lower the heat leakage losses) of the reducing chamber, the lower may be the temperature of the entering reducing gas.

The product of the reducing step or operation may be directly and without cooling subjected to subsequent treatment, such, for example, as a melting operation. In this event, the sponge iron product of the reducing operation will be conveyed to the subsequent treatment apparatus with the minimum loss of heat. Under such circumstances, the cooling operation hereinbefore described will obviously be dispensed with.

I claim:

1. The method of reducing iron ores which comprises supporting a layer of iron ore and carbonaceous material upon a moving perforate hearth, passing a combustion supporting gas through said layer while so supported and thereby heating said ore by the combustion of said carbonaceous material to a temperature sufficiently high for active reduction of compounds of iron therein, and advancing said heated ore while still supported on said hearth into a reducing zone in which a heated reducing gas is passed through the heated ore and perforate hearth, thereby reducing compounds of iron to sponge iron.

2. The method of reducing iron ores which comprises supporting a layer of iron ore upon a moving perforate hearth, subjecting said ore while heated to a temperature not less than about 850° C. to the action of a reducing gas passed through the ore and the perforate hearth and thereby reducing compounds of iron in the ore to sponge iron, and subjecting the product of said reducing step to a cooling treatment while still supported upon said hearth.

3. The method of reducing iron ores which comprises supporting a layer of iron ore upon a moving perforate hearth, passing a reducing gas through said layer of ore and perforate hearth while so supported and while maintained at a temperature sufficiently high to effect active reduction of the compounds of iron therein to sponge iron, and subjecting the product of said reducing step while still supported upon and moving with said hearth to the action of a substantially non-oxidizing cooling gas.

4. The method of reducing iron ores which comprises supporting a layer of iron ore and carbonaceous material upon a moving perforate hearth, passing a combustion supporting gas through said layer while so supported and thereby heating said ore by the combustion of said carbonaceous material to a temperature sufficiently high for active reduction of compounds of iron therein, advancing said heated ore while still supported on said hearth into a reducing zone in which a heated reducing gas is passed through the heated ore and perforate hearth thereby reducing compounds of iron to sponge iron, and subjecting the product of said reducing step to a cooling treatment under substantially non-oxidizing conditions.

5. The method of reducing iron ores which comprises supporting a layer of iron ore upon a moving perforate hearth, heating said layer of ore while so supported to a temperature sufficiently high for active reduction of compounds of iron therein, advancing said heated ore while still supported on said hearth into a reducing zone in which a heated reducing gas is passed through the heated ore and perforate hearth thereby reducing compounds of iron to sponge iron, and advancing the product of said reducing step into a cooling zone in which a substantially non-oxidizing cooling gas is passed through the product.

6. An apparatus for reducing iron ores to sponge iron comprising a reducing chamber, a moving perforate hearth adapted to progressively advance the ore to be reduced through said chamber, gas ports in said chamber above and below said hearth, and means associated with said gas ports for circulating a reducing gas through said chamber and for regenerating the reducing capacity of said gas between passages thereof through the chamber.

7. An apparatus for reducing iron ores to sponge iron comprising a heating chamber and a reducing chamber, a moving perforate hearth adapted to progressively advance the ore to be reduced first through said heating chamber and then through said reducing chamber, means associated with said heating chamber for promoting the heating of the ore in the course of its progress therethrough, gas supplying means and gas withdrawing means associated with said reducing chamber on opposite sides of said hearth respectively, and means associated with said gas withdrawing and gas supplying means for circulating a reducing gas through said chamber and for regenerating the reducing capacity of said gas between passages thereof through the chamber.

8. An apparatus for reducing iron ores to sponge iron comprising a heating chamber and a reducing chamber and a cooling chamber, a moving perforate hearth adapted to progressively advance the ore to be reduced first through said heating chamber and then through said reducing chamber and finally through said cooling chamber, and gas supplying means and gas withdrawing means operatively associated with each of said chambers on opposite sides of said hearth respectively.

9. An apparatus for reducing iron ores to sponge iron comprising a heating chamber, a reducing chamber, and a cooling chamber, and a perforated grate of the endless conveyor type adapted to convey ore to be treated through said chambers in the order named.

10. An apparatus for reducing iron ores to sponge iron comprising a heating chamber, a reducing chamber, and a cooling chamber, and a perforated grate of the endless conveyor type adapted to convey ore to be treated through said chambers in the order named, the walls of said reducing chamber adjacent the heating chamber and cooling chamber extending closely to said grate so that gases employed in one chamber may not readily seep over into another chamber.

11. An apparatus for reducing iron ores to sponge iron comprising a heating chamber, a reducing chamber, and a cooling chamber, and a perforated grate of the endless conveyor type adapted to convey ore to be treated through said chambers in the order named, said reducing chamber being provided with a port above and a port below said grate for the introduction and withdrawal of reducing gases.

In testimony whereof I affix my signature.

HOWARD J. PARDEE.